United States Patent [19]

Stelmack

[11] 4,408,825
[45] Oct. 11, 1983

[54] VACUUM ULTRAVIOLET REFLECTANCE FILTER

[75] Inventor: Lawrence A. Stelmack, Somerville, Mass.

[73] Assignee: Acton Research Corporation, Acton, Mass.

[21] Appl. No.: 205,418

[22] Filed: Nov. 10, 1980

[51] Int. Cl.³ .............................................. G02B 5/28
[52] U.S. Cl. ..................................... 350/1.7; 350/166
[58] Field of Search ................... 350/1.7, 1.6, 166, 164

[56] References Cited
PUBLICATIONS

Spiller, E., *Applied Optics,* vol. 15, No. 10, Oct. 1976, pp. 2333–2338.
Hunter, W. R., *Optica Acta,* vol. 9, No. 3, Jul. 1962, pp. 255–268.
Sorokin et al., O. M., *Optical Tech.,* vol. 37, No. 6, Jun. 1970, pp. 343–346.
Schroeder, D. J., Jour. of the Optical Soc. of America, vol. 52, No. 12, Dec. 1962, pp. 1380–1386.

*Primary Examiner*—Jon W. Henry
*Attorney, Agent, or Firm*—James H. Grover

[57] ABSTRACT

A reflector which particularly reflects light at a selected peak wavelength in the vacuum ultraviolet (VUV) region and which absorbs light outside the VUV, particularly in the visible light region consists of a reflective surfaced substrate such as polished aluminum, a dielectric layer over the reflective surface, and a thin film of one or more of the six, non-radioactive metals tungsten, rhenium, osmium, iridium, platinum and gold. The thickness of the dielectric spacer layer is approximately one fifth that of the selected peak wavelength, and a second dielectric layer of the same thickness may be applied over the metallic thin film.

7 Claims, 4 Drawing Figures

VACUUM ULTRAVIOLET REFLECTANCE FILTER

BACKGROUND OF THE INVENTION

In the measurement of light by photometric instruments, particularly in space laboratory measurement of vacuum ultraviolet light from space in the presence of high intensity visible light from the sun, there is a recognized need for optics which favor reflection of the VUV wavelengths being studied and which reject near ultraviolet and visible light. For these purposes reflectance filters, as compared to the usual transmission filters, have been described by Osantowski and Toft in Applied Optics, Vol. 12, No. 6, pages 1114 and 1115, June, 1973, and also by Hass and Tousey, Journal of the Optical Society of America, Vol. 49, page 593, 1959.

The reflectance filter described by Osantowski and Toft comprised an opaque aluminum film covered by a quarter wavelength of magnesium fluoride over which a semitransparent aluminum film and a final protective magnesium fluoride layer.

It is the object of the present invention to provide a reflectance filter which has improved reflectance well into the vacuum ultraviolet and improved rejection of light outside the VUV.

SUMMARY OF THE INVENTION

According to the invention a reflectance filter comprises a substrate with a reflective surface; a spacer layer of transparent dielectric material on said surface; and a thin film spaced from the reflective surface by the dielectric layer, wherein said thin film is a heavy metal selected from the group consisting of tungsten, rhenium, osmium, iridium, platinum and gold and heavy metal alloys thereof. Preferably a second dielectric layer, approximately the same thickness as the spacer layer is applied over the thin metal film.

DRAWING

DESCRIPTION

Figure 3:
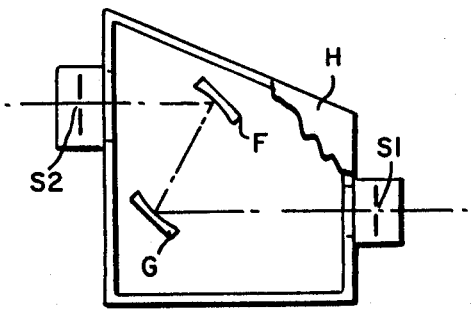
FIG. 3 is a schematic view of a monochromator using a reflectance filter according to the invention.

A typical photometric instrument employing the present reflectance filter is a vacuum monochromator as shown in FIG. 3. The monochromator comprises an evacuable housing H having a light entrance slit S1 and an exit slit S2. Light entering the entrance slit S1 is dispersed by a diffraction grating G in one or more spectra from the vacuum ultraviolet (VUV) region through the ultraviolet (UV), visible and infrared (IR) regions. A reflector F redirects part of the spectra to the exit slit which should pass a narrow frequency band in the VUV, for example. Stray light from the spectra outside the VUV will be transmitted by previous reflectors, and on the other hand, much of the VUV will be absorbed or attenuated by such prior reflectors.

Figure 1:
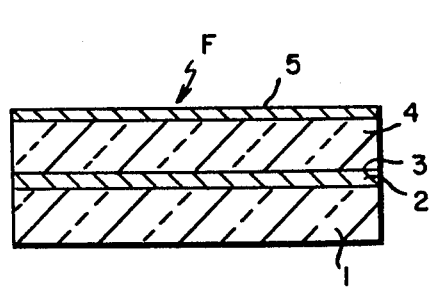
FIGS. 1 and 2 are sectional views of two forms of reflectance filter according to the invention.

The photometric reflectance filter F shown in FIG. 1 comprises a substrate 1 which is typically glass or quartz having an optically flat surface. On this surface is vacuum deposited a reflective layer 2 forming a reflective surface 3. Typically the layer 2 is aluminum just thick enough to prevent light transmission. An aluminum layer of 600 to 700 Angstroms (Å) thickness is sufficient to provide a surface 3 with a broad band of substantial reflectance in the vacuum ultraviolet (80% reflectance), ultraviolet (85%), visible (90%) and infrared (95%) regions above 1000 Å. For accurate measurements in the VUV, however, substantial reflection outside the VUV (above about 1850 to 2000 Å) is undesirable.

Over the reflective surface 3 is deposited a spacer layer 4 of transparent dielectric material such as the halides and oxides of alkaline metals and alkaline earth metals, for example, calcium fluoride, silica, silicon oxide, lanthanum fluoride, thorium fluoride and magnesium fluoride. The thickness of the spacer layer 4 is preferably between about 200 Å to 450 Å depending upon the VUV wavelength it is desired to reflect as will be further explained.

Over the dielectric spacer layer 4 and spaced from the reflective surface by the dielectric layer is a thin semitransparent film 5 of one of the heavy metals selected from the group consisting of tungsten, rhenium, osmium, iridium, platinum and gold and heavy metal alloys thereof. These are the six densest non-radioactive metals (excluding uranium), and have consecutive atomic numbers from 74 to 79. The preferred heavy metal film 5 is osmium. The heavy metal is vacuum deposited to a thickness of 30 to 70 Å.

The above disclosed thicknesses of the spacer layer 4 and the heavy metal film provide a reflector which selectively reflects a high proportion 80% of VUV incident light while reflecting only a minor fraction 5–10% of light outside the VUV. The thickness of the dielectric spacer layer is theoretically one half the VUV wavelength it is desired to selectively reflect, but in practice is approximately one fifth the selected wavelength. For example, for peak reflectance of VUV light at 1300 Å the dielectric spacer layer is approximately 275 Å thick. The osmium, or other heavy metal film 5 is vacuum deposited to a thickness just sufficient to attenuate light above the selected wavelength region to a minimum reflectance.

Figure 4:
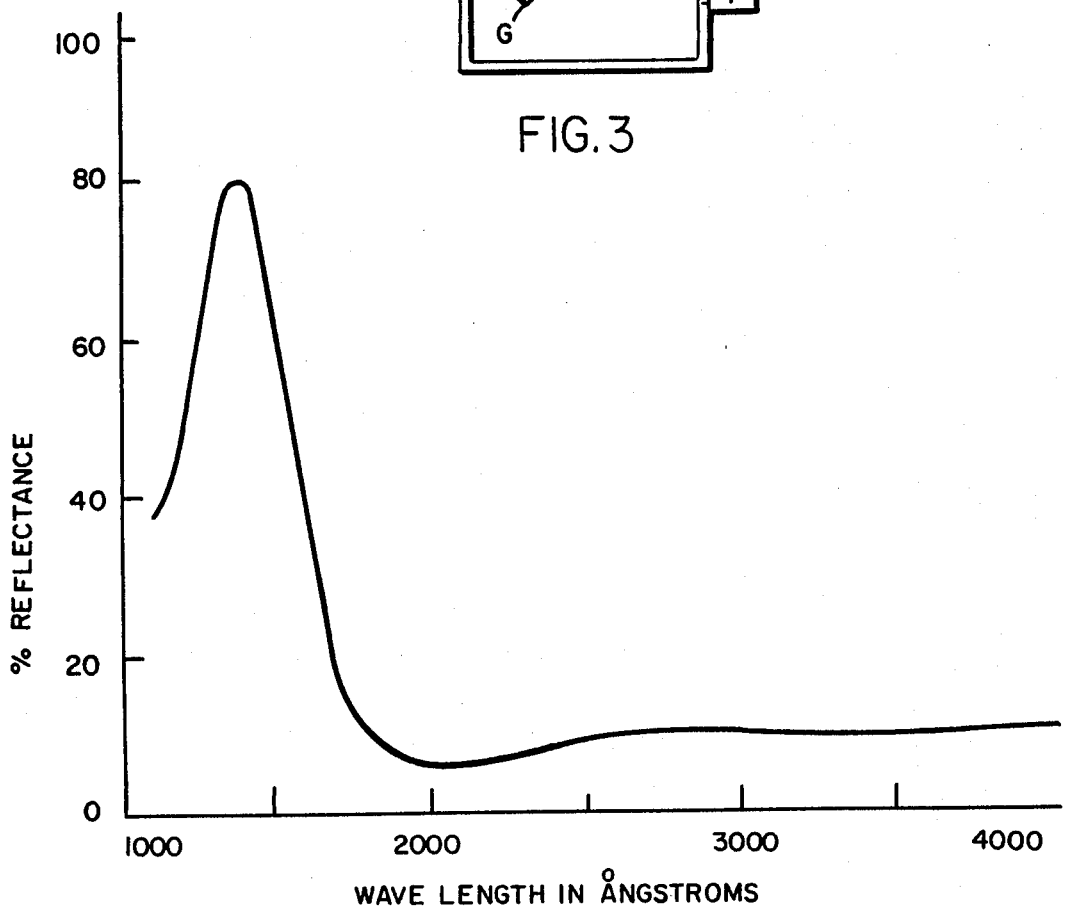
FIG. 4 is a graph of reflectance versus wavelength of the filter of FIG. 1.

The reflectance characteristic of a filter with a spacer layer 4 275 Å and an osmium film aout 50 Å thick is shown in FIG. 4. Such a filter has a peak reflectance of about 80% of incident light at 1350 Å wavelength well below the upper limit of the VUV (1950 to 2000 Å). In contrast the filter reflects only about 10% of incident light outside the VUV above 2000 Å. This reflectance is to be compared with that of the aluminum film filter of Osantowski and Toft, previously cited, which peaks at the 1850 Å border between the VUV and UV regions and which has as high as 70% reflectance at 2000 Å. The present reflector is thus selectively reflective substantially into the VUV and much more sharply attenuates light above the VUV.

Figure 2:
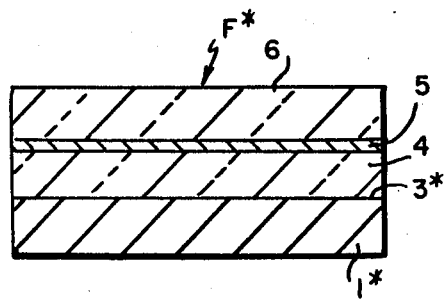

In FIG. 2 a similar reflectance filter F* is shown which has an opaque aluminum substrate 1* with its upper surface 3* forming an optically flat reflective surface. Additionally a transparent dielectric protective layer 6 is deposited over the heavy metal thin film 5, e.g. osmium, to a thickness approximately the same as the spacer layer 4. It has been found that such an additional dielectric layer not only protects the thin heavy metal film, but also increases the selectivity of the filter by greater attenuation of off band wavelengths.

It should be understood that the present disclosure is for the purpose of illustration only and that this invention includes all modifications and equivalents which fall within the scope of the appended claims.

I claim:

1. An ultraviolet reflectance filter comprising:
   a substrate with a reflective surface;
   a spacer layer of transparent dielectric material on said surface; and
   a thin film spaced from the reflective surface by the dielectric layer, wherein
   said thin film is a heavy metal selected from the group consisting of tungsten, rhenium, osmium, iridium, platinum and gold and heavy metal alloys thereof.

2. A filter according to claim 1 wherein the thin film is osmium.

3. A filter according to claim 1 wherein the thickness of the spacer layer is approximately one fifth of a wavelength in the vacuum ultraviolet light region.

4. A filter according to claim 1 having a reflectance of visible wavelengths of light which is a minor fraction of the reflectance of the filter in the vacuum ultraviolet.

5. A filter according to claim 4 wherein the reflectance of visible light is one fifth or less the peak reflectance of vacuum ultraviolet light.

6. A filter according to claim 1 including a second dielectric layer over the thin film.

7. A filter according to claim 6 wherein the second dielectric layer is approximately the same thickness as the spacer layer.

* * * * *